Nov. 13, 1945.   H. E. CARTER   2,388,668
FILTER
Filed Nov. 10, 1943   2 Sheets-Sheet 1
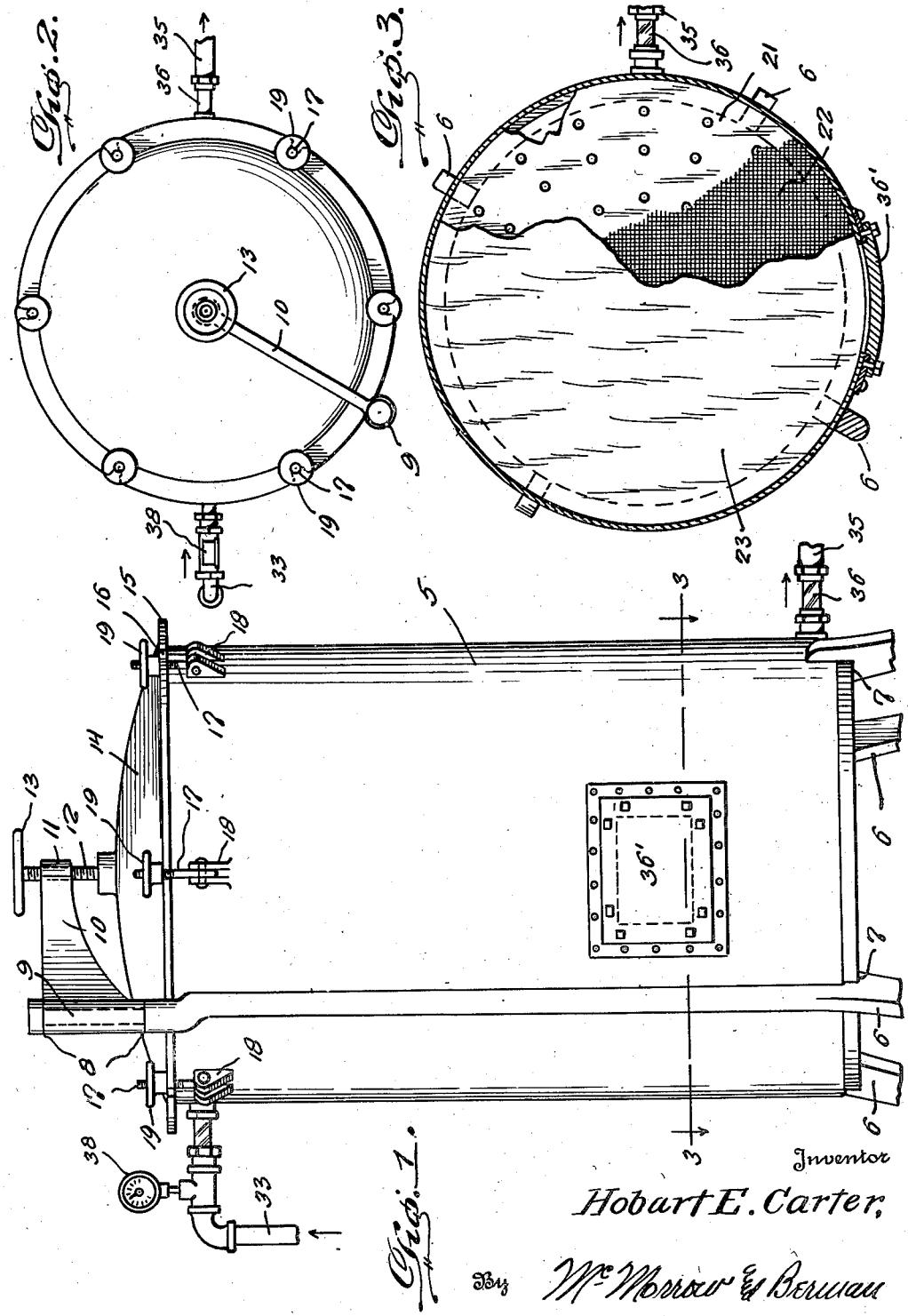
Inventor
Hobart E. Carter,
By McMorrow & Berman
Attorneys Nov. 13, 1945.   H. E. CARTER   2,388,668
FILTER
Filed Nov. 10, 1943   2 Sheets-Sheet 2
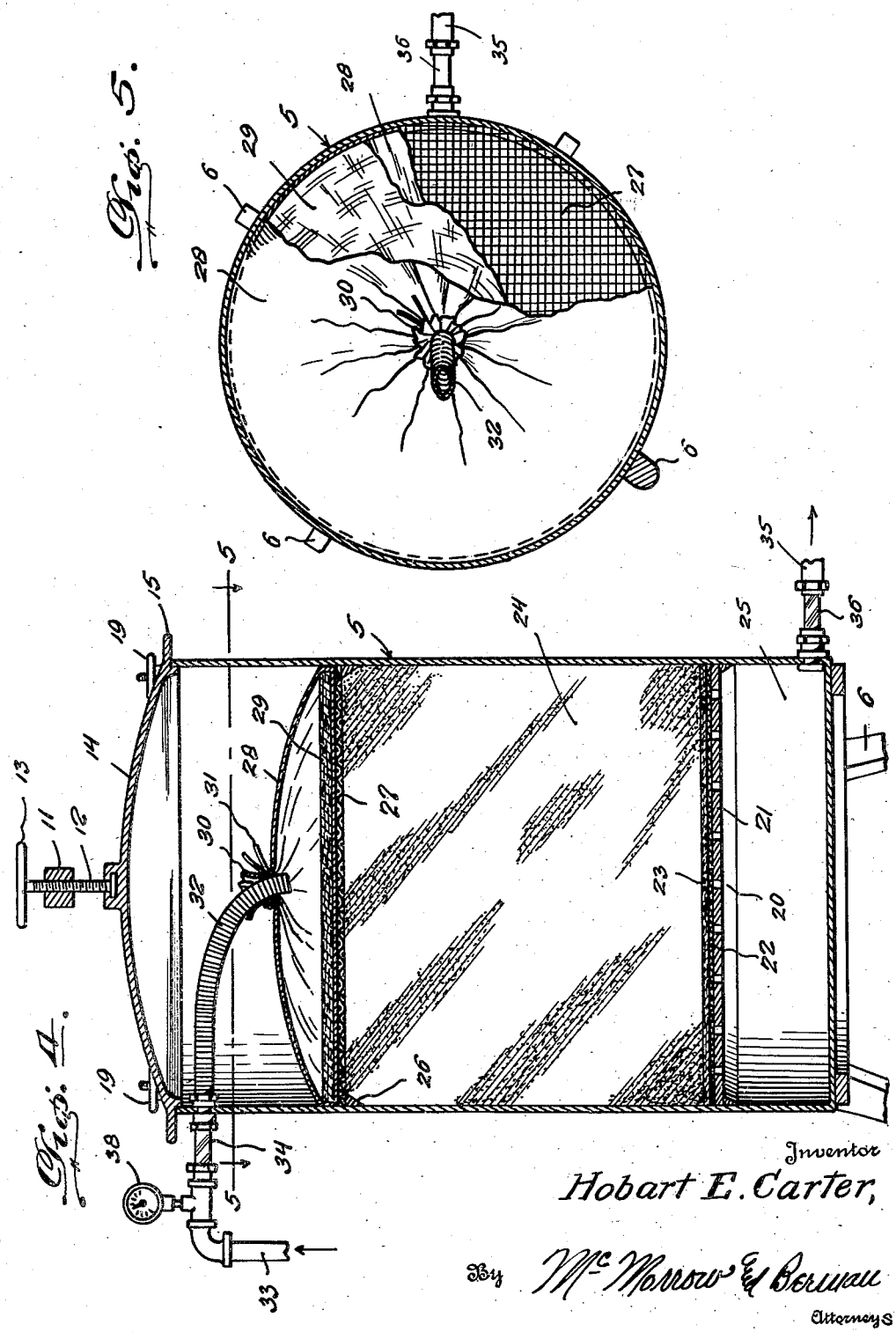
Inventor
Hobart E. Carter,
By McMorrow & Berman
Attorneys Patented Nov. 13, 1945

2,388,668

UNITED STATES PATENT OFFICE 2,388,668

FILTER

Hobart E. Carter, Monahans, Tex., assignor of one-third to Samuel T. Carter, Penwell, Tex., and one-third to Marshall A. Russow, El Paso, Tex.

Application November 10, 1943, Serial No. 509,754

3 Claims. (Cl. 210—134)

This invention relates to a filter especially adapted for use in dry cleaning plants, laundries and similar establishments for cleaning or the removal of foreign matter from solvent employed in washing machines, and has for the primary object the provision of a device of this character which will rapidly and efficiently recondition solvent, so that it may be reemployed in a washing machine many times and at a minimum cost and may be manufactured and sold at a low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a front elevation illustrating a filter constructed in accordance with my invention.

Figure 2 is a top plan view illustrating the device.

Figure 3 is a sectional view taken on the line 3—3 of Figure 1.

Figure 4 is a vertical sectional view illustrating the filter.

Figure 5 is a sectional view taken on the line 5—5 of Figure 4.

Referring in detail to the drawings, the numeral 5 indicates a cylindrical tank arranged in a vertical position upon supporting legs 6 notched, as shown at 7, to form seats to engage the tank and prevent the latter from accidentally moving off of said legs. One of the legs is of a much greater length than the other legs and terminates a considerable distance above the upper open end of the tank and is reduced to form spaced shoulders 8 and a pintle portion 9 on which is journaled an arm 10 prevented from moving endwise thereof by the shoulders 8. The free end of the arm 10 is provided with an internally threaded barrel 11 integral with said arm 10 and receives a feed stem 12 provided with a hand wheel 13. The feed stem 12 has rotatably secured thereto a cover or lid 14 employed for closing the upper end of the tank. The lid 14 is provided with a marginal flange 15 provided with a series of notches 16. The marginal flange 15 projects beyond the walls of the tank to receive bolts 17 pivoted to ears 18 formed on the tank. The bolts have nuts 19 threaded thereon and which may be turned against the flange 15 after the bolts have been passed through the notches 16 for efficiently securing the cover to the tank to prevent the escape of the contents of the tank.

A supporting flange 20 is arranged in the tank 5 at a selected distance above the bottom of the tank for supporting a perforated disc 21 on which is arranged a screen 22 of foraminous material. Overlying the screen 22 is a sheet of cloth 23 acting as a check to prevent filter material 24 from passing through the screen and perforated disc 21 but which will permit liquid as that of a solvent, after passing through the filter agent, to pass into a chamber 25 below the perforated disc, 21. The filter agent or material 24 may be fuller's earth or any other filtering agent suitable for the purpose.

A supporting flange 26 is arranged in the tank 5 a selected distance below the upper open end of the tank and supports a screen 27 of foraminous material. The filtering agent 24 extends from the filtering screen 27 to the sheet of cloth 23. A fibrous bag 28 is arranged on the screen 27 and located therein is a pad 29 of fibrous material, the size of which is approximately the size of the screen 27. The pad 29 maintains a portion of the bag resting flatly upon the screen 27. The mouth of the bag is indicated by the character 30 and is provided with a draw string 31. The mouth of the bag is placed over the free end of a flexible pipe 32 coupled to a solvent supply pipe 33 and in which is located a sight gauge 34. After the flexible pipe 32 has been arranged in the mouth 30 of the bag 28 the draw string 31 is actuated to draw the mouth tightly about the pipe so that the solvent coming into the flexible pipe will be discharged into the bag for passage through the pad 29, the portion of the bag resting against the screen and through the latter and the filtering agent 24. The solvent after passing through the filtering agent will have foreign material removed therefrom so that on passing through the sheet of fabric 23, screen 22 and perforated disc 21, will be received in the chamber 25 in a reconditioned state free of all foreign matter ready to be used again.

An outlet pipe 35 is coupled to the chamber 25 through which the purified solvent may pass and is provided with a sight gauge 36. The solvent supply pipe 33 may be connected directly to a washing machine so that the solvent from said washing machine may be forced directly into the filter through the use of a suitable pump (not shown). The outlet pipe 35 may return the purified solvent to the washing machine or to some storage tank where the purified solvent may be accumulated to be again used when needed.

The front wall of the tank 5 is provided with a removable door 36' so that the filtering agent 24 may be removed from the tank to permit other filtering agents to be placed in the tank in lieu of the original filtering agent. The change in the filtering agents will only have to be made at comparatively long intervals due to the fact that the bag 28 and pad 29 will catch the greatest amount of the foreign matter from the solvent received in the device. The bag 28 can be easily removed after being detached from the flexible pipe 32 through the upper end of the tank, the cover being easily releasable from the tank and swung laterally thereof by the arm rotating on the pintle portion 9 supporting the cover laterally of the tank leaving the entire upper end of the tank fully open.

The solvent supply pipe 33 may be provided with a pressure gauge 38 of any conventional construction.

From the foregoing description, taken in connection with the accompanying drawings, it will be seen that a very inexpensive filter has been provided wherein a solvent of a washing machine or similar device may be thoroughly filtered of foreign material and thereby reconditioned for further use at a nominal cost. Further, it is to be seen that the filter can be easily cleaned of the collected foreign material and that the filtering agent can be renewed whenever desired.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a filter, a tank, upper and lower screening mediums removably mounted in said tank, a filtering agent filling the space between the screen mediums, a filter bag including a pad resting on one of the screen mediums, a solvent supply pipe extending into the bag, means for closing the mouth of the bag about said supply pipe and an outlet pipe connected to the lower portion of the tank.

2. In a filter, a tank, filtering screens removably mounted in the tank and spaced from each other, filtering material arranged between said screens, a bag including a fibrous pad resting on the uppermost screen, a flexible pipe extending into the mouth of the bag, means for closing the mouth of the bag about the pipe, a solvent supply pipe connected to the flexible pipe, and a drain pipe connected to the tank.

3. In a filter, a tank, filtering screens removably mounted in the tank and spaced from each other, filtering material arranged between said screens, a bag including a fibrous pad resting on the uppermost screen, a flexible pipe extending into the mouth of the bag, means for closing the mouth of the bag about the pipe, a solvent supply pipe connected to the flexible pipe, a drain pipe connected to the tank, and sight tubes arranged in the supply pipe and in the drain pipe.

HOBART E. CARTER.